INVENTORS R. E. LE CRONIER
E. E. SCHWENZFEGER
BY S E Hollander
ATTORNEY

INVENTORS R. E. LE CRONIER
E. E. SCHWENZFEGER
BY S E Hollander
ATTORNEY

DATA TRANSMISSION SYSTEM

INVENTORS R. E. LE CRONIER
E. E. SCHWENZFEGER
BY S E Hollander
ATTORNEY

April 28, 1964 R. E. LE CRONIER ETAL 3,131,263

DATA TRANSMISSION SYSTEM

Filed Dec. 18, 1961 7 Sheets-Sheet 4

INVENTORS R. E. LE CRONIER
E. E. SCHWENZFEGER
BY SE Hollander
ATTORNEY

INVENTORS R. E. LE CRONIER
E. E. SCHWENZFEGER
BY SEHollander
ATTORNEY

INVENTORS R. E. LE CRONIER
E. E. SCHWENZFEGER
BY S E Hollander
ATTORNEY

INVENTORS R. E. LE CRONIER
E. E. SCHWENZFEGER
BY
SE Hollander
ATTORNEY 3,131,263
Patented Apr. 28, 1964

1

3,131,263
DATA TRANSMISSION SYSTEM

Richard E. Le Cronier, Sea Bright, N.J., and Edward E. Schwenzfeger, Douglaston, N.Y., assignors to Bell Telephone Laboratories, Incorporated, New York, N.Y., a corporation of New York Filed Dec. 18, 1961, Ser. No. 160,010
15 Claims. (Cl. 179—18)

This invention relates to data transmission systems and more particularly to methods and means for improving low-speed data links.

Data links are conventionally classed as either high-speed or low-speed. The designation generally refers to the capacity of the link, that is, the number of binary bits per second that can be transmitted. The more complex and costly high-speed data links are capable of handling tens and hundreds of thousands of bits per second as contrasted with their low-speed counterparts which may be able to accommodate only a few thousand bits per second.

Low-speed data links offer many advantages; included among these are their simplicity and inexpensiveness. A major advantage of these links is that ordinary telephone lines may be the means for physically connecting the two end units. The telephone lines in use throughout the world are generally capable of passing a limited frequency band, generally in the order of 3,000–4,000 cycles per second. Telephone lines could thus be used as the transmission medium for a data link having a capacity of a few thousand bits per second. It is apparent that existing telephone plant is exceedingly attractive as far as low-speed data links are concerned, for no additional transmission media need be designed or manufactured. Existing telephone circuits may be connected between the two end units whenever a communication path is desired.

Although low-speed data links are highly attractive for the reasons enumerated above as well as for other reasons, their low capacity is often a disadvantage. Many systems require a capacity slightly higher than that offered by a low-speed link, and consequently the alternative high-speed links must be employed. These latter links often have a capacity considerably greater than that needed for the system, and the slight increase in usable capacity does not justify the very much increased cost.

The present invention is a data transmission system wherein a low-speed data link is employed. Means are provided at both end units for increasing the capabilities of the link, however, without actually exceeding the maximum number of bits per second that can be transmitted along the low-speed link without introducing an excessive error rate.

The invention is applicable to those systems wherein data is transmitted from each end unit to the other along two distinct paths. In such systems the information transmitted from one unit to the other often depends on the immediately previously transmitted data in the other direction; that is, the data now being sent from unit 1 to unit 2 depends on the data sent from unit 2 to unit 1 immediately prior to the present transmission. A specific example will be illustrative of this type of system. In the setting up of an ordinary telephone conversation there is a form of question and answer sequence between the subscriber and the central office. For example, if a party desires to make a call, he first lifts his handset. When he goes off-hook, information is transmitted to the central office notifying it of his service request. The central office when replies with dial tone. The subscriber in turn answers with his dial pulses. If a special type of call is being placed, a long distance call for example, an operator often transmits voice information from the central office back to the subscriber. In fully automatic systems,

2 there is no voice communication in setting up a call, but equivalent switching information is transmitted back and forth between the subscriber and the central office and much of the information transmitted from one unit to the other is directly dependent on the previously transmitted data in the other direction; what might be considered to be the "answer" depends directly upon the "question."

In common control telephone systems having remote switching units, the subscribers are often located a considerable distance from the central office. The setting up of a call requires the transmission of digital data, often in binary form, back and forth between a subscriber and the central office. As telephone lines already connect the subscribers with the central office, it is apparent that low-speed data communication equipment is desirable, for then the telephone plant itself may be utilized as the data link for transmitting switching information. However, the low-speed character of telephone lines may forbid their use in such satellite systems. In many concentrator systems, for example, the switching information pertaining to a plurality of subscribers is all sent along separate control paths. If much information must be transmitted between the two units for each call that is set up and if the calls are being set up at a rapid rate it is apparent that low-speed telephone lines may not have the required capacity.

This invention will be described hereinbelow as comprising a two-direction data link connecting a central office and a remote subscriber unit. It must be borne in mind, however, that the communication link is equally applicable to other types of systems. Although the invention will be described with reference to "calls" originating in either the central office or the remote unit with the sequence of data transmission necessarily relating to information pertaining to telephone switching, the term "call" should be interpreted broadly as referring to any type of transmission sequence initiated by either end unit in any system where the data link of this invention is applicable. In order that the invention will be understood to have widespread applicability, although the description of the circuit will be effected by reference to a telephone system, the data sequences required for the telephone system will be described in as broad terms as possible consonant with an understanding of the invention. In this manner the broad scope of the invention will become apparent.

It is an object of this invention to provide an improved data communicatioin system.

It is another object of this invention to provide a higher speed of operation for a low-speed data link.

It is still another object of this invention to provide a transmission system employing a low-speed data link wherein the realization of the highest possible capacity of the system is achieved.

In the telephone system with which the illustrative embodiment of the data link of the invention is employed, relay matrices are disposed at both central office and remote units. These two relay matrices are maintained in identical states. When a relay in either unit is energized, this operation being effected either by a subscriber or the central office, this information must be transmitted to the other unit. For example, if a subscriber requests service, the lifting of his handset energizes a relay in the matrix located in the remote unit. A scanner normally scans a scan point matrix, the state of each point in the matrix being controlled by a respective relay. The scanned information is transmitted to the central office unit where a receiver operates upon the incoming data and energizes the equivalent relay in the central office matrix. Similarly, the energization of a relay in the central office matrix results in the transmission of appropriate data to the remote unit where the equivalent relay is energized.

In this manner, the central office and remote telephone equipments may operate directly from or upon the relay matrices in the same respective locations.

In certain prior systems a scanner is generally disposed at each unit and continuously scans every scan point in sequence. The energization state of the associated relay is determined by the scanner and the equivalent information transmitted to the other unit. The scanning is continuous and random insofar as a particular call is concerned. The remote or central office telephone equipment may cause a particular relay to be operated. This information is transmitted to the other unit only when the scanner reaches in due course the particular scan point representative of the state of the associated relay.

In a typical prior art system, consider that many different types of calls may be placed by either the remote or central office units; for example, a subscriber at the remote unit may wish to place a call to another party at the same remote unit or at a different remote unit. For a particular type of call originating in the remote unit, the remote unit transmits data sets 1, 3, 5, . . . to the central office. The central office transmits data sets 2, 4, 6, . . . to the remote unit. The sequence of sets of data transmitted is 1, 2, 3, 4, 5, 6, . . . . Conventionally, the remote unit transmits set 1, the central office unit receives this data, operates appropriate equipment and then energizes the relays in the central office unit comprising set 2. The scanner in the central office unit transmits data pertaining to the relay matrix at that unit and in the course of its operation transmits the data contained in set 2. The remote unit receives this data, energizes its relays in set 2 accordingly, and causes the relays in set 3 in the remote matrix to be energized in the appropriate manner. When the scanner in the remote unit eventually scans this set, the data is transmitted to the central office unit. This process continues until the call is set up after all the required information has been transmitted back and forth between the two units.

It is apparent that one of the disadvantages of this system is that a set of data is not transmitted immediately upon the energization of the appropriate relay group. The scanners are random and independent of the telephone switching network and consequently only transmit relevant sets of data as they are reached in the normal scanning process. The setting up time of a call might be materially reduced if each scanner were capable of scanning in a controlled manner, that is, by scanning and transmitting a particular set of data immediately upon its origination in the appropriate relay group.

It is another disadvantage of this typical prior art system that before each unit may transmit information to the other, it must first wait for its previously transmitted data to be received by the other unit, for the other unit to digest this information, and for the other unit to reply. However, often one or two sets of data sent by one unit to the other do not depend on the immediately prior data sent in the other direction. The call could be set up in a reduced time were it possible for either unit to transmit two sets of data in succession in the event that the second set of data does not depend on the data normally sent back in response to the first set of data.

In accordance with an illustrative embodiment of the invention a stored program control is disposed at each unit. Each time a call is to be set up by one of the two units, that unit notifies both stored program controls of the type of call to be set up. Each type of call requires different sets of data to be transmitted back and forth. For a type A call, originating in the central office, the sets of data might be contained in seven particular groups of relays which might be designated sets A, *m*, *n*, *q*, *u*, *w* and *x*. For a type B call which might originate in the remote unit, the sets of data might be contained within relay sets B, *n*, *r*, *t*, *w*, *p*, *s* and *y*. Each stored program control, once it is notified of the type of call to be set up, knows which sets of relays must be scanned at its own unit and the data represented thereby transmitted to the other, and which sets of relays at its own unit must be set in accordance with data transmitted from the other unit. The stored program control governs the operation of the scanner control. This latter element is a means for controlling the scanner to scan the particular necessary sets of relays in sequence. The scanners in the present invention are not random in the manner described above; they do not scan the two scan point matrices in an independent fashion. Instead, each scanner is controlled to scan particular sets of scan points in succession, the particular sequence being dependent on the particular type of call to be placed.

Each stored program control, knowing the type of call, also has knowledge of which sets of relays contain data which are not dependent on the normal immediately previously transmitted data from the other unit. For example, for a type A call the data set *q* sent by unit 1 might be independent of the data set *n* normally sent immediately prior thereto by unit 2. For a type B call it might be set *p* sent by unit 2 that is independent of set *w* sent by unit 1. The stored program control governs the scanner and the transmitting circuits in each unit to transmit those sets of data which are immediately available rather than waiting for data to be sent from the other unit which is not determinative of the next set of data to be normally transmitted back. Thus, in a type A call, the remote unit will transmit its set *q* immediately after it transmits set *m* rather than waiting for set *m* to be received by the central office unit and for the central office unit to respond with set *n*. In this manner, the central office unit has available in its relay matrix set *q*, required from the remote unit, immediately after it operates upon set *m* and transmits set *n* to the remote unit. It can thus immediately operate upon set *q* and the setting up time of the call is reduced by the time required to transmit two sets of data along the link. Similar remarks apply to a type B or any other type of call. Each stored program control knows which sets of data may be transmitted independently of the normal priorly sent data from the other unit and thus transmits different sets of data prior to their normal transmission time for each different type of call.

Another aspect of the invention includes a further arrangement by which a more rapid transmission or setting up of the call may be effected. Very often only one of the many relays in a set is energized. For example, in some telephone systems only one of the horizontal select magnets is energized, the remaining nine of the group being unoperated. Thus only one relay in each set representing this data is energized. With ordinary transmission, nine "zero's" and a single "one" must be transmitted. However, it is apparent that for such a word four bits would be sufficient if rather than having each bit represent a particular relay the four bits are coded so that together they represent the particular single relay which is energized. Thus, suppose the ninth relay of a certain set is the only one energized. Normal transmission would require the transmission of 0100000000. However, four bits would be sufficient if the *coded* number 1001 ("nine" in binary form) were sent. To reduce the setting up time of the call and to thus increase the "capacity" of the system, the latter word is sent for the particular case illustrated. The stored program controls, knowing the type of call to be processed, know which sets must be transmitted in coded form rather than in the ordinary fashion. That unit where the word originates is controlled to transmit the particular word or words in coded form. The other unit knows that the particular word received is in coded rather than ordinary form, decodes the word, and sets the appropriate set of relays accordingly.

It is a feature of this invention to provide means for either unit in a transmission system to notify the other of the type of "call" to be processed or the sequence of data to be transmitted back and forth between the two units.

It is another feature of this invention to provide means for controlling the scanner at each end of a transmission system to scan sets of scan points in a predetermined sequence in accordance with the particular type of "call" to be processed.

It is another feature of this invention to provide means in each end unit of a transmission system for transmitting sets of data immediately when they become available rather than first waiting for the normal preceding transmitted data in the other direction to be received, when such data is not determinative of the data to be sent.

It is still another feature of this invention to provide means in each of the end units of a transmission system for coding and decoding particular sets of data rather than transmitting these sets in the normal fashion for each type of "call" to be processed or sequence of data to be transmitted back and forth.

Further objects, features and advantages of the invention will become apparent upon consideration of the following description taken in conjunction with the drawing wherein:

FIGS. 1–6 disclose an illustrative embodiment of the invention;

FIG. 7 shows the arrangement of FIGS. 1–6; and

FIG. 8 discloses symbolically the sequences of operations of the circuit of FIGS. 1–6 in certain specific instances.

*The Method of the Invention*

The method of improving the low-speed link may be understood by reference to FIG. 8 wherein the sequences of operations are disclosed for two particular types of calls. In a type A call, transmission originates in the central office. The left-most diagram discloses the normal sequence of transmissions in a typical prior art system. The first piece of data transmitted is from the central office to the remote unit. This piece of information, designated A, might notify the remote unit of the type of call to be set up, for example an intro- or inter-office call. The remote unit then responds with its first and the system's second set of data, this set of data originating from relay set *m* located in a relay network at the remote unit and controlled by the remote unit switching equipment. This data is transmitted to the central office where it is acted upon. In response to this action the central office energizes relay set *n* appropriately. This information is then transmitted to the remote unit. The remote unit receiver then sets relay set *n* accordingly, and the remote equipment acts upon this data. It then transmits the fourth piece of data, this set originating in relay set *q* at the remote unit. In a similar manner, sets *u*, *w* and *x* are transmitted.

The arrows connecting the second and fourth pieces of data, transmitted from the remote unit to the central office, are indicative that the fourth set of data, set *q*, is immediately available within the relay matrix in the remote unit after the first set of data, A, is received. That is the remote unit has not only the relays of set *m* set in response to the reception of and action upon set A, but in addition, has set *q* available as well. In other words, although the remote unit transmits set *m* after set A is sent from the central office to the remote unit, set *q* is not determined by set *n* and is instead determined by and, therefore, available after the transmission of set A.

The sixth item of information, set *w* is indicated by a dotted arrow. A dotted arrow in FIG. 8 is used wherever a set of data is known in advance to contain only one "one" (or two "ones," etc.).

In accordance with aspects of the invention the call is set up in a reduced period of time as shown by the right-most diagram depicting a type A call sequence. It is to be understood, although not disclosed in FIG. 8, that, as described heretofore, both units do not continuously scan their respective scan point matrices. When the remote unit operates upon set A, it energizes the appropriate relays in set *m* and associated scan points. However, the remote unit does not ordinarily transmit this information to the central office unit until the scanner scans these relays in due course. In the invention, however, the stored program control in the remote unit, when notified that a type A call is to be processed, immediately controls the scanner to scan set *m*. Similarly, for example, when the central office unit receives set *w*, its stored program control is aware that the central office scanner must then scan set *x*. The scanner scans this particular set, after allowing sufficient time for the central office equipment to energize the set, and transmits the information. In this manner, the scanning of the two relay matrices or associated scan points is not a random and independent procedure but rather is intimately related to the particular type of call or sequence to be processed.

The right-hand diagram for the type A call illustrates two additional methods by which the setting up call time is reduced. It has been described above that set *q*, transmitted by the remote unit, is not dependent upon set *n* received by it. Thus, set *q* is available at the same time as set *m* in the remote unit matrix. The remote unit responds to set A with sets *m* and *q*, set *q* immediately following set *m*. Both of these sets are then stored in the central office relay matrix. The central office normally responds with set *n* after receiving set *m*. It does so in the invention as shown in the diagram. The third transmission starts with set *n*. Normally, the central office must wait for the remote unit to receive set *n* and to transmit set *q* back. However, set *q* is immediately available in the relay matrix of the central office. The central office thus acts upon set *q* immediately after it has transmitted set *n*. The central office then energizes set *u* accordingly and immediately transmits set *u* after set *n*. The remote unit first receives set *n*. Normally, it transmits set *q* and waits for set *u* to be received back. However, the stored program control at the remote unit knows of the particular type of call being processed and, consequently, is aware of the fact that set *q* has already been transmitted and that set *u* is now stored in the relay matrix at the remote unit. The remote unit, therefore, acts upon set *u* immediately after it acts upon set *n*.

After operating upon set *u* the remote unit energizes set *w* and transmits this information to the central office. However, for a type A call set *w* always contains only one "one" (or two "ones," etc.). Consequently, rather than transmit set *w* in its entirety, the remote unit codes this set and transmits in coded binary form the particular one of the group of relays in set *w* that is energized. Thus, fewer binary bits must be transmitted. The stored program control in the central office unit is likewise aware that the incoming set of data is in coded form. The central office unit decodes set *w* and sets the relays in the central office matrix accordingly. It then responds with set *x* in the normal manner.

It is thus seen that instead of seven sequences of data being transmitted only five need be sent in accordance with our invention. Whatever time is required for the data to be transmitted in either direction, it is apparent that the setting up time of the call is materially reduced. In addition, one of these five sequences of data is in coded rather than ordinary form, requires fewer bits and, consequently, results in an even further reduction in the time required for the data to be transmitted.

The normal sequence for a type B call, originating at the remote unit, is depicted in the same manner as that for a type A call. Set *r*, the third set of data transmitted, from the remote unit to the central office, is independent of set *n* and, consequently, is available in the remote unit at the same time that set B is. Similarly, set *p* does not depend upon set *w* and is available in the central office with set *t* after set *r* has been received from the remote unit and operated upon. And as shown, set *w* always contains a predetermined number of "ones."

In accordance with the invention, for a type B call rather than requiring eight transmitted sequences of data only four are needed. As set *r* is available initially with set B in the remote unit, both are transmitted at the same time, set *r* following set B. Relay sets B and *r* are set accordingly in the central office. The central office unit then acts upon set B, energizes set *n* in the appropriate manner and transmits this information to the remote unit. As set *r* is already available in the central office relay matrix, the central office need not wait for set *n* to be received by the remote unit and for set *r* to be transmitted back. Instead, the central office directly acts upon set *r* which is already stored in the relay matrix in the central office and immediately sends back set *t*. The central office does not cease transmitting with set *t* either. As shown in FIG. 8, set *p* sent by the central office is independent of set *w* received by it from the remote unit. Set *p* is immediately available with set *t*. Consequently, the central office unit transmits set *p* immediately following set *t*. Thus the second sequence of data, sent from the central office to the remote unit, comprises sets *n*, *t* and *p* in succession.

The remote unit receives these three sets of data and the appropriate relays are energized in the remote unit relay matrix. The remote unit acts upon set *n* first. Normally set *r* is transmitted after set *n* is received. However, as set *r* is independent of set *n* it was already transmitted initially with set B. The remote unit thus responds with the next set of data, set *w*. And as shown, it is in coded rather than ordinary form. Both the central office and remote units realize that this piece of data should be in coded form and operate upon it accordingly. Normally, after transmitting set *w*, the remote unit waits for set *p* to arrive, digests it, and transmits set *s* back. However, set *p* has already been stored in the relay matrix in the remote unit. The remote unit, therefore, need not wait for set *w* to be sent to the central office and for set *p* to come back. It has set *p* immediately available. The remote unit, therefore, acts upon set *p* and sends back set *s*. Set *s*, therefore, immediately follows set *w*. The first half of the third sequence transmitted is as shown in coded form. The second half, set *s*, is sent in the normal manner.

The central office first receives set *w* in coded form, decodes it and energizes the appropriate relays. Normally, the central office then transmits set *p*. However, as set *p* is independent of set *w* and has already been transmitted with sets *t* and *n*, the central office is ready to digest set *s* which arrives immediately after set *w*. It does so and responds with set *y*.

Thus, in a type B call only four sequences of data need be transmitted rather than the normal eight. And a part of one of these four sequences is in coded rather than ordinary form so that the setting up time of the call is reduced still further.

Before describing the circuit of FIGS. 1–6, the features and methods whereby the transmission back and forth of a sequence of data is made more rapid might be advantageously summarized as follows:

(1) The scanner control in each unit controls a scanner to scan a particular sequence of sets of scan points rather than to scan in an ordinary continuous, independent and random fashion. The particular sequence of sets scanned is determined by the particular type of call to be processed. This might be considered to be a "spatial" control.

(2) The transmitter in each unit is controlled to transmit those sets of data which are independent of the normal previously sent data from the other unit immediately as they become available. This might be considered to be a "time" control.

(3) Means are provided in each unit which cause those sets of data having a predetermined number of "ones" to be transmitted in coded rather than ordinary form in order to reduce the number of bits required to identify the particular set.

*General Description*

The two end units of FIGS. 1–3 and FIGS. 4–6 are connected by the four transmission lines 226, 230, 206 and 267 as shown. These lines are telephone plant or similar low-speed links. The two end units are similar in both design and operation.

In the central office 100 the information to be transmitted to the remote subscriber unit 600 originates in relay matrix 101. In the invention, data pertaining to the operation of relays 104 within matrix 101, effected by the central office, is transmitted along transmission line 226 to the remote subscriber unit. The equivalent relays in matrix 500 are then operated. In response to the operation of these relays, the remote subscriber unit causes other relays to be operated within matrix 500. This information is transmitted along transmission line 267 and results in the relay setting circuit 305 effecting the operation of the equivalent relays in matrix 101. The central office then energizes others of the relays in matrix 101, this information is transmitted to the remote unit, etc. The process continues until the call is set up.

When the central office desires to set up a call, for example, a call initiated by a calling party, information pertaining to the type of call to be processed is transmitted via conductor 129 to the data link seizure circuit 127. This information is then transmitted along conductor 126 to the sequence format detector 200. The data link seizure circuit is provided in order that either the central office or remote unit be able to complete the processing of a call without being interrupted by the seizure of the data link by the other unit. If the central office seizes the link first, its call is processed before the remote unit can initiate a call of its own. Similarly, if the remote unit desires to process a call, its seizure of the data link enables it to do so without interruptions from the central office attempting to set up a call of its own.

The data link seizure circuit 127 includes contacts 264–1, 264–2 and 264–3. When either unit seizes the data link, relay 264 in the stored program control 240 is operated and opens the three normally closed contacts within the data link seizure circuit 127. This prevents either unit from attempting to seize the data link for the purpose of placing another call until the present call is completely processed.

The original data from the central office, prior to the operation of relay 264, is transmitted via conductor 126 to sequence format detector 200. This detector comprises a translator 202 and a plurality of relays 201–A through 201–N, each of these relays being operated for a brief period when a respective type of call is initiated. The data on conductor 126 pertaining to the type of call to be processed is translated by the translator within sequence format detector 200 and causes a particular one of the relays contained therein to be operated. The operation of this relay closes the one set of respective contacts 201–A–1 through 201–N–1 within stored program control 240 and thereby notifies the latter of the particular type of call to be processed. This notification is shown symbolically by arrow 265.

In the event that it is the remote unit which desires to initiate the call, data pertaining to the type of call to be processed appears on conductor 301, as explained in detail hereinafter. This data is thus transmitted to sequence format detector 200 and again a particular one of the relays within the sequence format detector 200 is operated. The particular type of call to be placed is again told the stored program control 240 by the sequence format detector 200 when a particular one set of contacts 201–A–1 through 201–N–1 is operated.

The remote unit must also be notified of the fact that the central office desires to place a call when such is the case and also be told of the particular type of call to be processed. The original data on conductor 129 is transmitted through the data link seizure circuit to conductor 125. This information enters coder 115. All data to be transmitted passes through this coder in a manner to be described hereinbelow. The stored program control 240 controls this coder and the transmitter 221 to transmit all data. The stored program control has been notified that the link has been seized and its first function is to control the transmission of the original data to the remote unit where the stored program control 400 in that unit is notified. The incoming data at the remote unit is applied to conductor 409 and then to conductor 601. The sequence format detector 403 is operated in a manner identical to the operation of sequence format detector 200 when the first information from the remote unit is received by the central office unit in the event that it is the remote unit that desires to set up the call.

Once the link has been seized and the two stored program controls have been notified of the type of call to be processed (and which unit desires to place it as the "type" of call depends on the unit wherein it originates), relays 264 and 404 in respective stored program controls 240 and 400 are energized, over paths described further below, and open the respective normally closed contacts 264–1 through 264–3 and 404–1 through 404–3 within each data link seizure circuit. The link cannot be seized until the present call is completed and the stored program controls release the energized relays 264 and 404 and the contacts close once again. Until this time, both inputs to each sequence format detector are opened, and no information to these detectors can be received.

The energization states of the various relays within matrix 101 are determined by scanning a plurality of terminals 110 within scanner 108. These terminals are all connected by conductors as shown, to respective terminals within scan point matrix 105. Each of these terminals is associated with one of the relays within matrix 101. The operation of any one of relays 104 causes respective contacts 104–1 within scan point matrix 105 to close, this relationship being shown symbolically by arrows 102. This in turn causes the associated terminal to be connected directly to a potential source 103. In this manner, information pertaining to the energization states of the relays in matrix 101 is available at the terminals 110 in scanner 108.

The improved data transmission system of the invention has been described as involving three features. These three depend upon what has been described directly above—the notification of both stored program controls of the particular type of call to be processed and which unit is initiating the call. The stored program controls may include full-scale computers, although it is apparent that less complex equipment may be provided in view of the limited functions to be performed. The stored program controls, therefore, include elements designated "A subprogram control," etc. which are shown symbolically only.

First and second features of the invention relate to the scanning of the scan point matrix in a controlled fashion. The scanning is in a sequential manner, that is, particular groups of scan points are scanned in succession for each type of call to be processed. And there is control of the scanning in time as well as in space. Not only are the various groups within the scan point matrix scanned in a predetermined sequence, but in addition, the scanning is performed at times determined by the stored program controls, that is, at times when information is known to exist within the scan point matrix, although the other unit has no need of this information immediately.

The spatial control of the scanner 108 is achieved by operating a particular one of the relays 128–A through 128–N within scanner control 120. For each type of call to be processed, a particular set of contacts 201–A–1 through 201–N–1 within stored program control 240 are closed. The closing of any set of contacts controls the energization of a respective one of relays 128– which in turn controls the particular spatial scanning sequence of scanner 108.

The time sequence of scanner 108 is controlled by the stored program control 240 notifying the scanner along conductor 114 when to scan the next group, that is, the group determined by scanner control 120. When the stored program control is aware that the next group to be scanned is already contained within the scan point matrix, it pulses conductor 114 and causes scanner 108 to scan this group. The information is transmitted immediately rather than waiting for return information in response to the previously transmitted data to be received from the remote unit.

A third feature summarized above for speeding up the data transmission relates to coding those sets of data having a predetermined number of "one's" rather than transmitting them in ordinary form. The stored program control, knowing the type of call to be processed, knows which sets of data should be coded. Relay 218 in the stored program control operates the two sets of contacts 218–1 and 218–2 within coder 115, the arrow 266 merely showing the symbolic connection. Normally, all data determined by the scanner 108 enters coder 115 via conductor 112. This information is passed along the top conductor and diode in the coder and conductor 117, and is then stored in the transmitter 221. In the event that a particular set of data is to be coded, the normally open contacts 218–2 within coder 115 close and the normally closed contacts 218–1 open. The data now passes through the lower conductor and translator 116 to transmitter 221. In passing through translator 116 it is coded and the coded information rather than the full-length set of data is stored in transmitter 221. Translator 116 may be any of well known translation devices.

The transmitter 221 is an ordinary shift register, the various stages being shown symbolically. When the word is completely stored in the transmitter, the stored program control applies shift pulses along conductor 220 to the shift terminal input of the transmitter. The bits are then pulsed out along conductor 224 in succession and enter modulator 225. Modulator 225 merely transforms the information pulses into signals more suitable for transmission purposes. These signals are then transmitted along transmission line 226 to demodulator 406 at the remote unit.

As in many transmission systems, it is desired to check the accuracy of the transmission. For this reason, the data transmitted along transmission line 226 is returned along transmission line 230. It enters demodulator 229 which restores the signals to the original data pulse form. These pulses are transmitted along conductor 228 and are stored in the lower shift register of comparator 227. When the word is initially stored in transmitter 221, it is also stored in the top register of comparator 227. The arrow 222 is symbolic of a plurality of conductors connecting transmitter 221 to the top register of comparator 227. When the return word is received, the two words stored in comparator 227 are compared to each other. A plurality of AND gates, not shown in the drawing, may be used to achieve this result. One of two signals is then applied along conductor 231 to the stored program control 240. One of these signals notifies the stored program control that the word received back along transmission line 230 is identical to the word transmitted along transmission line 226. This is an indication that no error has occurred in the transmission. In the event, however, that the two words do not match, an error has occurred. The same word must be transmitted once again and the second of the two signals on conductor 231 notifies stored program control 240 to retransmit this set of data. When the word is originally shifted out of transmitter 221, it is restored in the same transmitter. As each bit is shifted out along conductor 224 to modulator 225, it is also sent back along conductor 223 to the transmitter input.

The entire word thus gets restored in the transmitter and is available in the event it is necessary to retransmit the word. The stored program control merely applies the correct number of shift pulses to conductor 220 which again shift out the word. This process continues until no error occurs in the transmission. At this point the next word is stored in transmitter 221 and transmitted to the remote unit. Before the next word is thus stored, however, the transmitter must be reset to clear the previously restored word. The pulse on conductor 231 is also applied to the reset terminal of transmitter 221. That one of the two signals on this conductor indicating an errorless transmission resets the transmitter.

The stored program control 240 also controls the received data from the remote unit. Data originating in remote subscriber unit 600 is also modulated for transmission purposes within modulator 407. The signals transmitted along transmission line 267 are demodulated by demodulator 207, and the original sequence of pulses determined by scanner 502 appear along conductor 209. These pulses enter decoder 310. Two sets of contacts 212–1 and 212–2, are provided in the decoder, the contacts being controlled by relay 212 within stored program control 240. This control is shown symbolically by arrow 211. Normally, all the pulses are transmitted through the normally closed contacts 212–1 to conductor 309 connected to the relay setting circuit 305. The stored program control 240 is aware of which incoming data is in coded rather than in ordinary form. Before such a set of data is received, the normally closed contacts 212–1 are opened and the normally open contacts 212–2 are closed. The data pulses are thus transmitted through the lower path in decoder 310 and pass through translator 311 contained therein. The translator decodes the coded pulses and provides a succession of pulses on conductor 309 identical to the original sequence of pulses derived by scanner 502.

It should be noted that the received data is also transmitted along conductor 301. The data pulses on conductor 301 have no effects as the normally closed contacts 264–2 within the data link seizure circuit 127 are now open.

The incoming data on conductor 309 controls the setting of the relays 104 within matrix 101. This data must be directed to the particular relays equivalent to those relays scanned at the other unit. The contacts on only one of the movable wipers within the relay setting circuit are operated at any one time so that only one of the plurality of terminals connected to respective relays in matrix 101 are energized in sequence to set the associated relays. This spatial control is similar to that of scanner 108 and includes relay setting circuit control 300. The time control, that is, the signals for moving the wipers 308, is achieved by the stored program control pulsing conductors 258 and 261.

The two scanners and two relay setting circuits of the invention operate on the same principle. In each of these there are a plurality of groups of terminals, each group being associated with a respective group of relays in the central office or remote unit. There are a plurality of conducting wiper arms in each scanner and relay setting circuit, each of these arms contacting in sequence a respective group of terminals when the associated motor is operated. However, normally open contacts are included in each wiper arm. Thus, if all of these contacts remain open, none of the voltage conditions on any of the group terminals in the scanners pass along the wiper arms to the common terminal to which the arms are connected. Similarly, the voltage pulses at the common terminal in each of the relay setting circuits could not pass along the wiper arms to the respective terminals associated with the relays in the central office and remote units. The scanner controls and relay setting circuit controls, however, cause the contacts in only one wiper arm in a respective scanner or relay setting circuit to be closed at any one time. Consequently, in scanning, the voltage conditions at the terminals of only one group are passed along the respective arm in sequence to the common terminal, from which they go to the transmitter. Similarly, the received pulses at the common terminal in each relay setting circuit pass along only one wiper arm to a respective group of terminals in sequence and cause the associated group of relays to be set accordingly.

Although, in the embodiment shown, each group of scan points is scanned serially, it is apparent that parallel scanning techniques may be utilized as well. In such a system all the scan points in a particular group would be scanned simultaneously, and the corresponding data stored in the transmitter. This would increase the speed of the system. Serial scanning has been shown, however, merely to reduce the complexity of the drawing. Similar remarks apply to the relay setting circuits.

The end unit of FIGS. 4–6 is similar to that of FIGS. 1–3, and the operation of this circuit is similar to that of FIGS. 1–3. The scanner control 504 provides a space controlled scanning process. Similarly, the scanner 502 is controlled by pulses on conductor 408 to scan in a time controlled fashion. And coder 503 codes those particular sets of data for which it is known there exist a predetermined number of "one's." The relay setting circuit 602 is controlled in the same manner as is circuit 305 of FIGS. 1–3, and a transmission checking circuit is also provided.

*Detailed Description*

Figure 1:
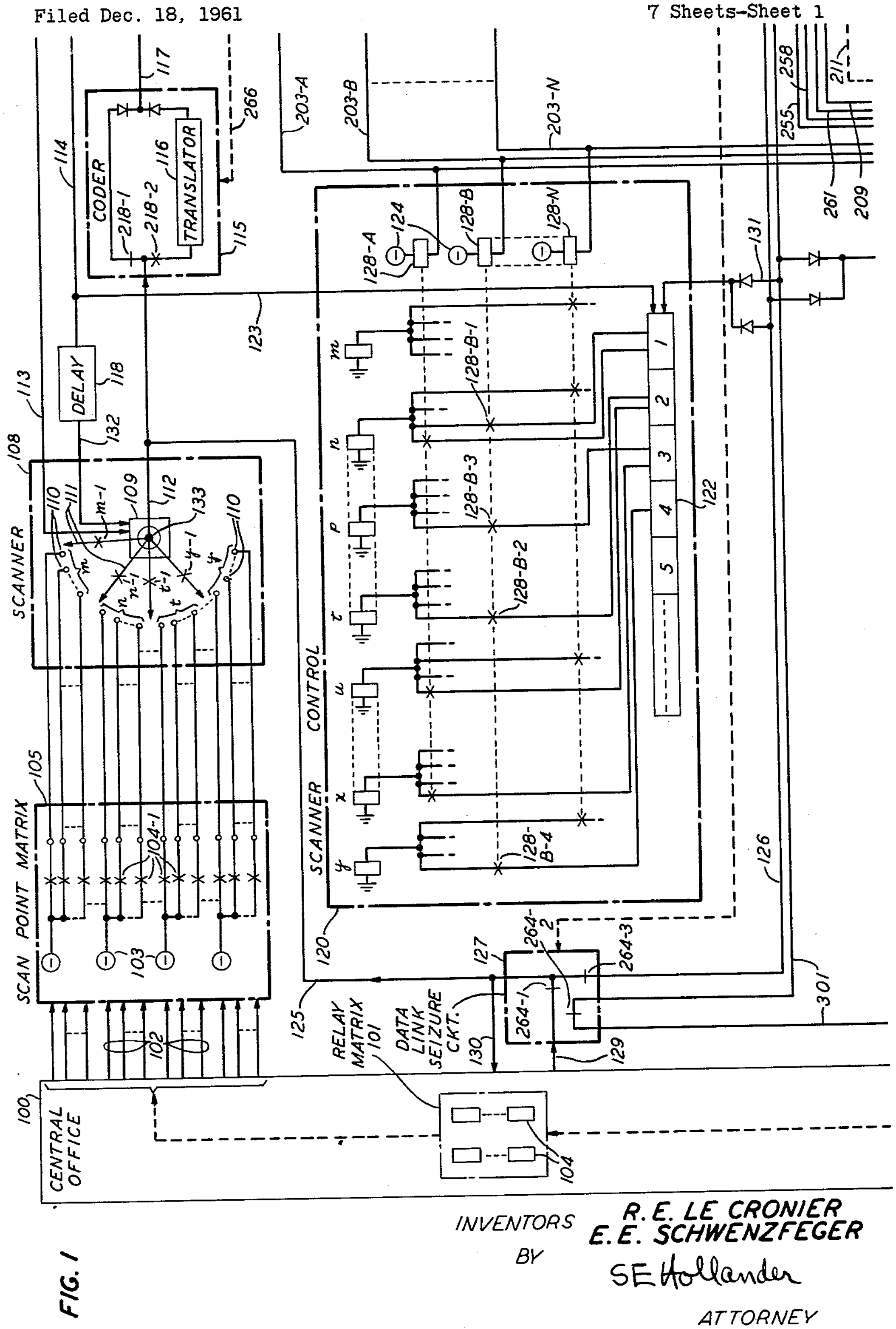
Figure 2:
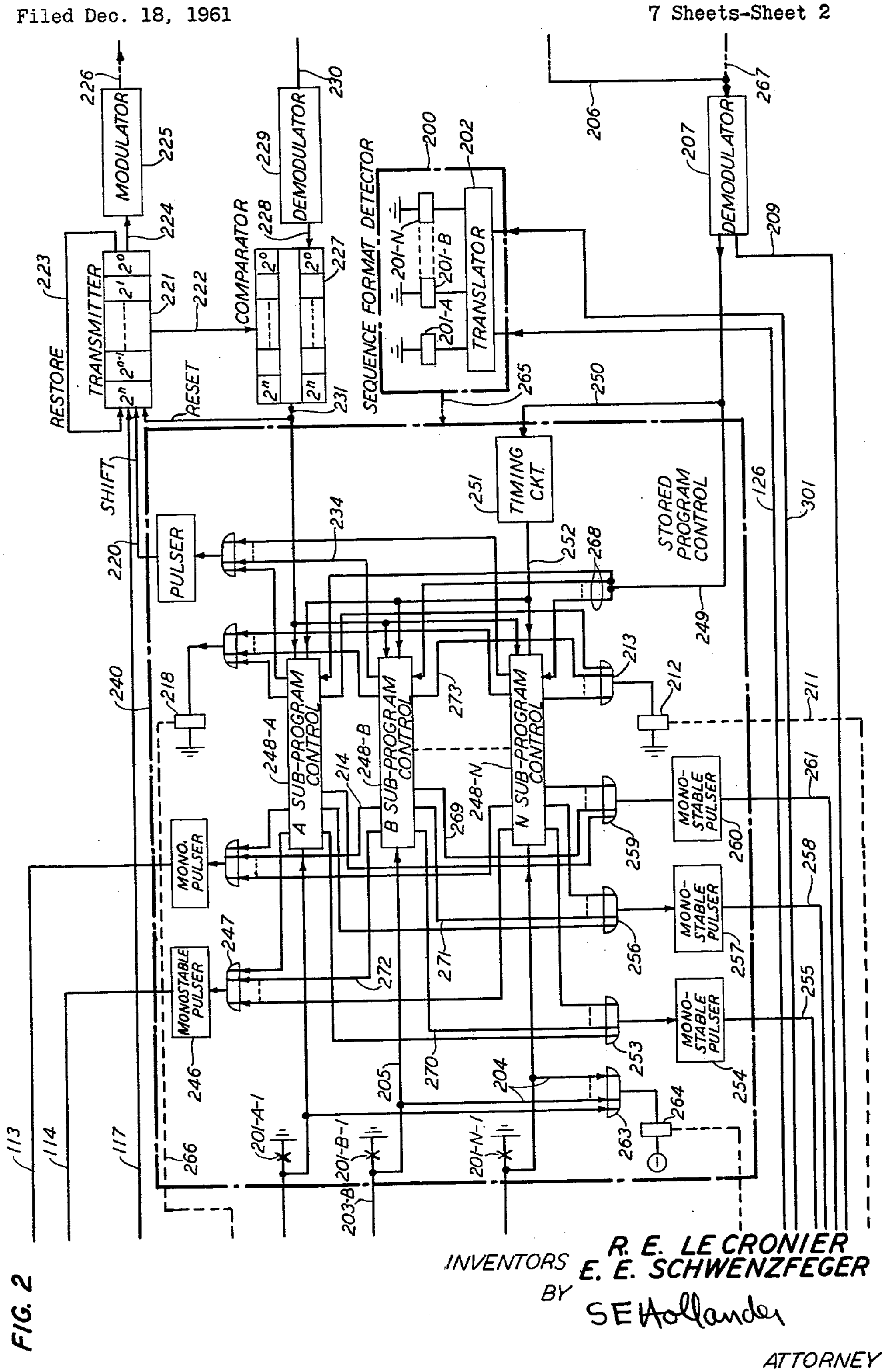
Figure 3:
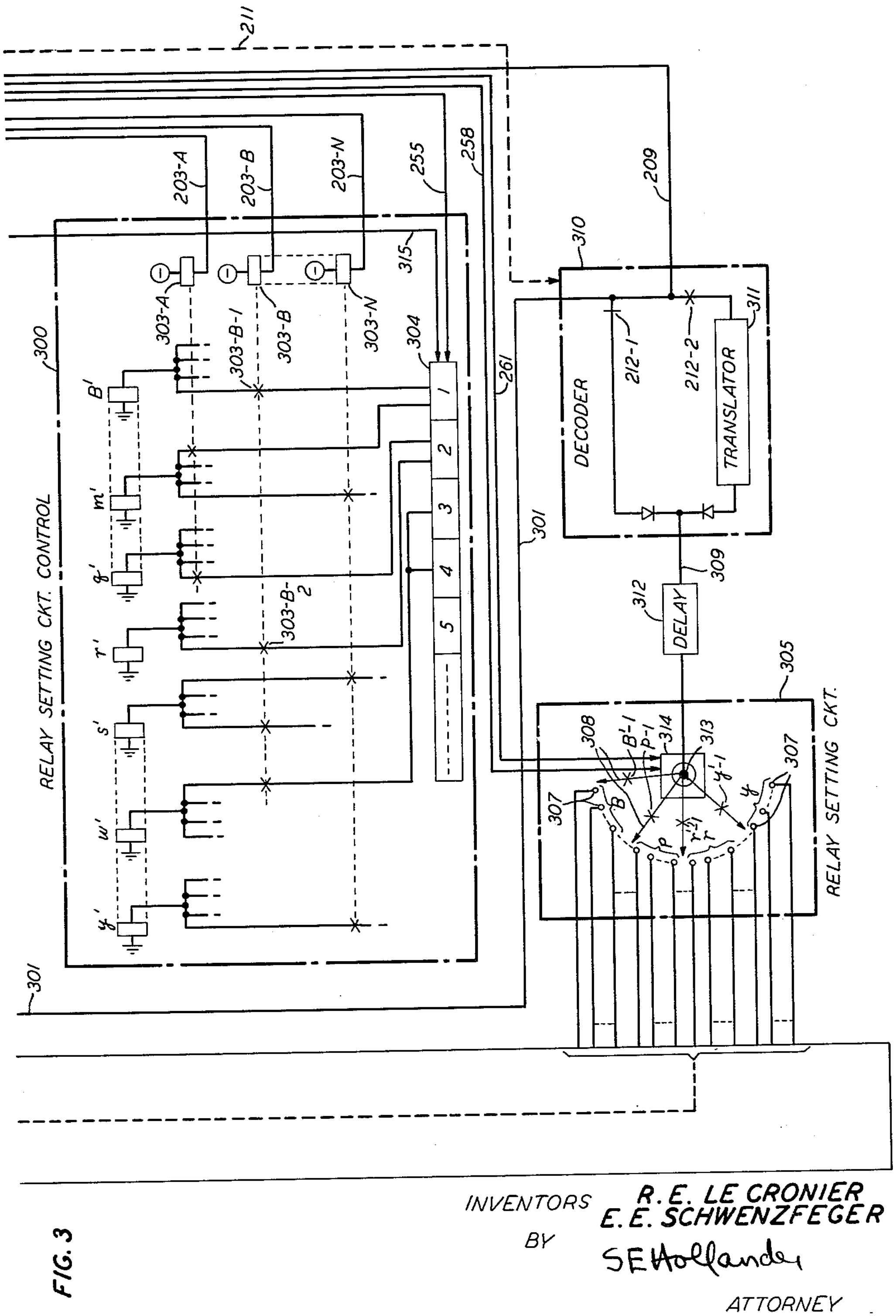
Figure 4:
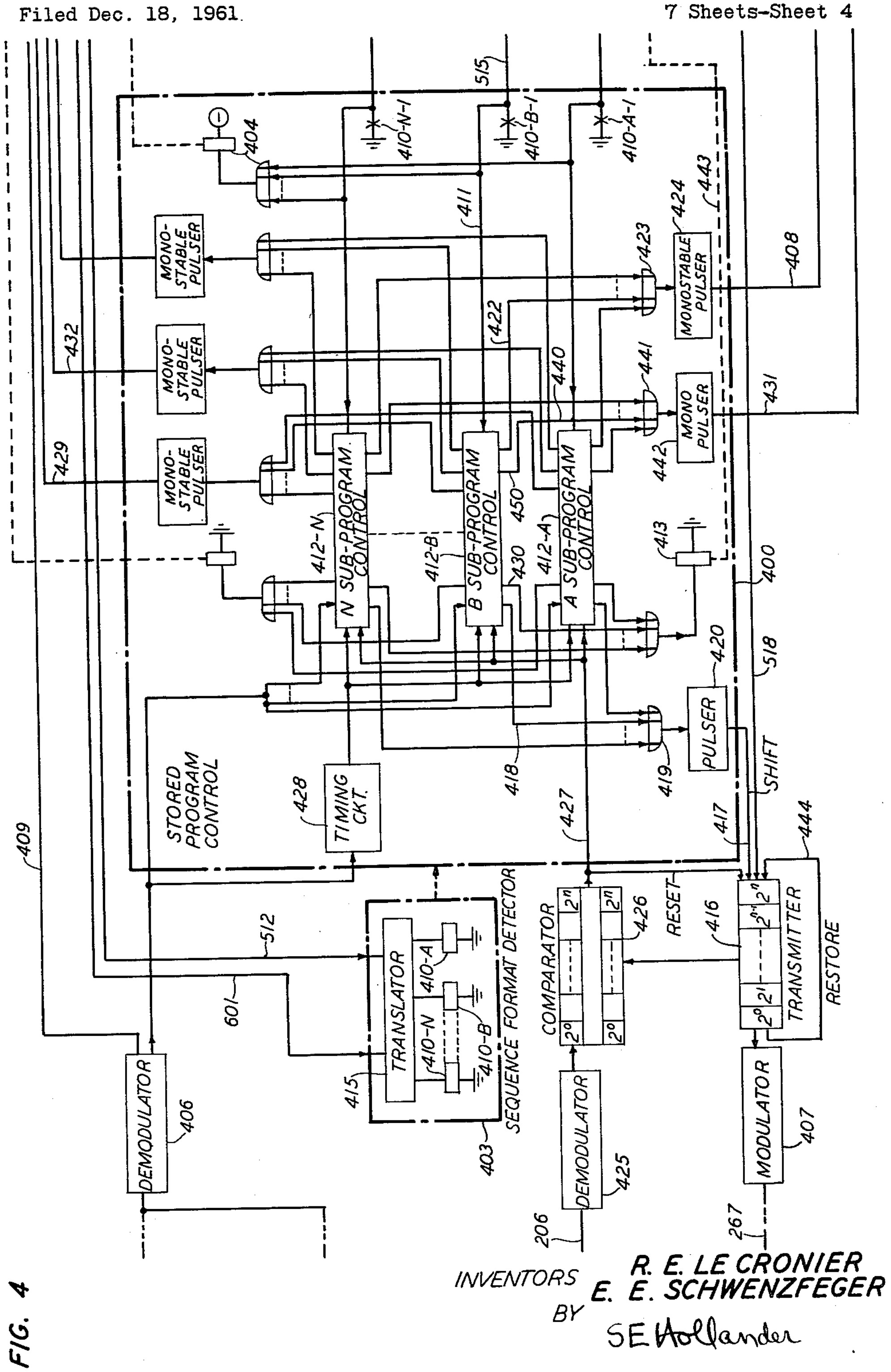
Figure 5:
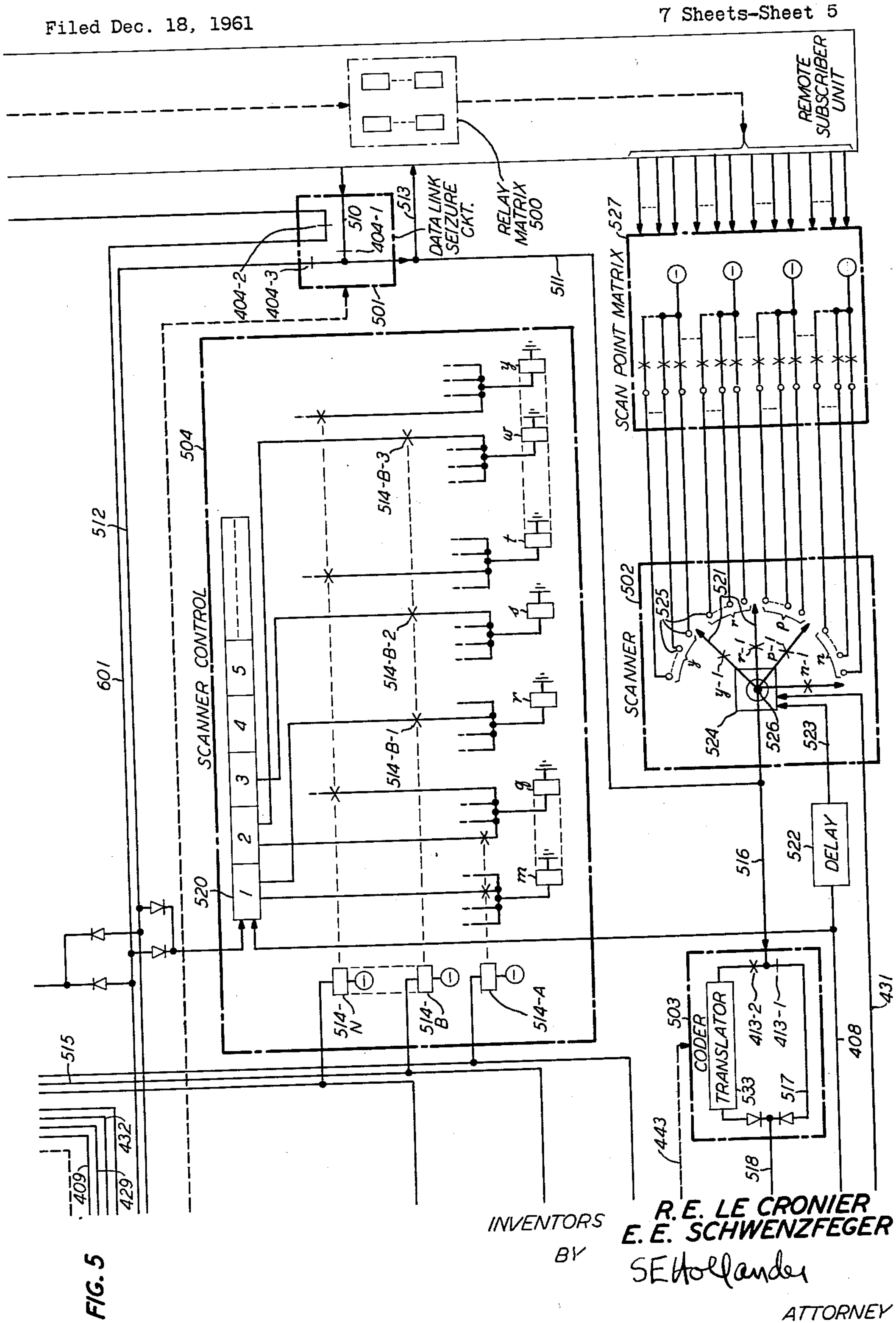
Figures 6, 7:
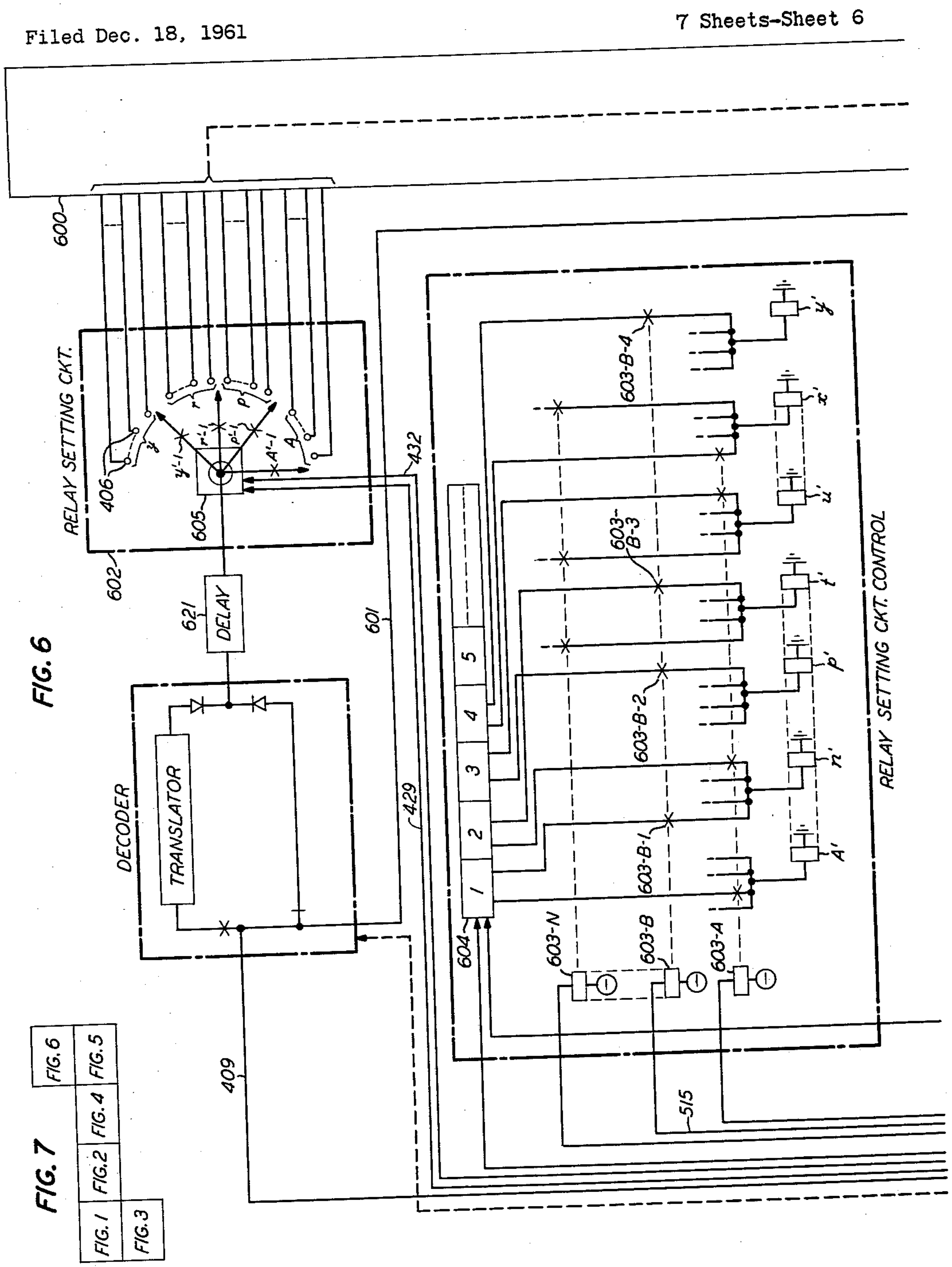

A detailed description of the circuit may be best effected by analyzing the sequence of operations for a particular type of call. The following detailed description will be made with reference to a type B call, originating at the remote unit.

A type B call originates at the remote unit when that unit applies a succession of binary pulses to conductor 510. These pulses represent information data set B. If the data link is not already in use servicing another call, contacts 404–1 are closed, as shown. The data pulses are transmitted along conductors 511 and 512 to notify both stored program controls that the remote unit desires to place a type B call. At the same time, the data pulses are transmitted back to the remote unit along conductor 513. This is done in order to notify the remote unit that the data link has been seized. In the event that the link is already in use for servicing another call, placed by the central office unit for example, contacts 404–1 are open and the pulses applied to conductor 510 by the remote unit are not sent back to the remote unit along conductor 513. The remote unit is thus notified that the link has not been seized and attempts to seize it once again a short while thereafter. This process continues until the remote unit determines that the link was initially free and has now been seized for servicing its call.

The original information pulses on conductor 512 are directed to one of the two inputs of sequence format detector 403. This input is directly connected to one of the two inputs of translator 415. The information pulses causes one of relays 410–A through 410–N to be operated for a brief interval. For a type B call, relay 410–B is operated in response to set B being applied to the input conductor 512 of sequence format detector 403.

Each of relays 410–A through 410–N controls a respective set of contacts 410–A–1 through 410–N–1 in stored program control 400. When relay 410–B energizes, contacts 410–B–1 close. Ground potential is applied to conductor 411, connected to one of the inputs of the subprogram control 412–B. With the application of the signal, this computer-like element is energized and functions for the duration of the call processing. The other N–1 subprogram controls are not energized and consequently, although input signals are applied to other inputs on these subprogram controls, no outputs are applied to the respective output conductors as these elements are not energized. The only subprogram control that responds to the input signals to be described hereinafter, by applying output signals to the particular conductors to be detailed below, is the subprogram control 412–B.

The element 412–B is equipped with a circuit for grounding conductor 411, once this conductor is initially grounded by the closing of contacts 410–B–1. Consequently, although these contacts release when relay 410–B de-energizes after a brief interval, conductor 411 remains grounded by the operation of the element 412–B itself, and the element 412–B remains energized. This ground is removed from conductor 411 only at the termination of the processing of the particular type B call being serviced and is effected by the subprogram control 412–B itself which determines when all of the necessary data pertaining to the call has been transmitted.

The grounding of conductor 411, first by the closing of contacts 410–B–1 and then by a locking circuit provided in the subprogram control 412–B causes relay 514–B to be operated. The operation of this relay causes contacts 514–B–1 through 514–B–3 to close. The closing of these contacts in turn determines the spacial scanning sequence of scanner 502.

The grounding of conductor 411 also causes ground potential to be applied to conductor 515, and relay 603–B operates. Contacts 603–B–1 through 603–B–4 close and determine the particular relays in matrix 500 which are energized in accordance with incoming information from the central office units.

In this manner, the original information pulses, set B, cause a particular one of the subprogram controls to be energized, in this case the B subprogram control. It is this latter element that governs the timing control of the scanner and relay setting circuit, the coding and decoding of various sets of data as well as numerous other operations.

It is also necessary, however, to notify the central office unit that the remote unit has seized the data link and desires to process a type B call. For this reason, the original information pulses are also applied to conductor 511. These pulses pass along conductor 516, through normally closed contacts 413–1, and conductors 517 and 518 to the data input of the transmitter shift register 416. These pulses are stored in the shift register as they come in. The element 412–B causes the application of shift pulses to the shift control conductor 417. The subprogram control 412–B knows which information is being stored in the transmitter 416, that is, set B, and as this information originated on conductor 511 simultaneously with the origination of this information on conductor 512, the information is always stored in transmitter 416 a predetermined time after the closing of contacts 410–B–1 and the energization of subprogram control 412–B. Consequently, the shift pulses are applied by subprogram control 412–B only after the entire data set B is stored in transmitter 416. The B subprogram control applies a succession of pulses to conductor 418, this conductor being connected to one of the inputs of OR gate 419. The other inputs of this OR gate are connected to outputs of the other N–1 subprogram controls and are not pulsed as these other elements are unenergized. The number of pulses applied to conductor 418 by subprogram control 412–B depends upon the number of bits in data set B. These pulses pass through OR gate 419 into the input of pulser 420. Pulser 420 reshapes the pulses and applies them to the shift input of transmitter 416. Data set B is shifted out from transmitter 416 into modulator 407. The pulses are transformed into more suitable signals for transmission purposes and are transmitted along conductor 267 to the end unit associated with the central office.

The demodulator 207 converts the transmitted information into the original pulse form. Pulses representing data set B are applied to conductors 209 and 249. The pulses applied to conductor 209 enter decoder 310. These pulses are transmitted through normally closed contacts 212–1 to delay 312. The pulses are also sent along conductor 301, through normally closed contacts 264–2 in the data link seizure circuit 127 and then continue along conductor 301 to one of the two inputs of sequence format detector 200. Translator 202 causes relay 201–B to operate for a brief interval in response to the application of data set B to the sequence format detector input. Contacts 201–B–1 close and the subprogram control 248–B is energized in a manner identical to the energization of subprogram control 412–B at the other end unit. Conductors 205 and 203 are grounded and as a result, relays 128–B and 303–B energize. The contacts of these relays close in a manner similar to the closing of contacts 514–B–1 through 514–B–3 and 603–B–1 through 603–B–4.

The grounding of conductor 205 grounds one of the inputs to OR gate 263. The output of the OR gate is consequently grounded as well and relay 264 energizes. Contacts 264–1 through 264–3 in the data link seizure circuit 127 open. The opening of contacts 264–1 prevents the central office unit from seizing the data link until the present call is completely processed and conductor 205 is no longer grounded, at which time relay 264 releases. The opening of contacts 264–2 prevents further incoming data pulses from erroneously operating sequence format detector 200. Only the first data set, indicating the type of call to be processed and originating in the other unit, controls the operation of a sequence format detector. Similarly, in the other unit the grounding of conductor 411 causes relay 404 to energize and contacts 404–1 through 404–3 in the data link seizure circuit 501 to open.

The first set of data, set B, notifies the subprogram control 248–B that it is the only subprogram control which should govern further operations. It is also necessary, however, to energize relay set B in matrix 101, as the central office must be notified that a type B call is to be processed. The original incoming pulses on conductor 209 pass through normally closed contacts 212–1 to delay 312. The pulses are applied after passing through delay 312 to terminal 313 which is connected to each of the wiper arms 308. When conductor 261 is pulsed, motor 314 causes all of the wiper arms in the relay setting circuit 305 to rotate in the counter-clockwise direction. As seen, a plurality of terminals are passed by the respective wiper arms as they rotate. Each terminal is connected to a relay energizing circuit in matrix 101. For example, if a binary "one" is applied to the right-most terminal 307 in group B, the first relay in group B in matrix 101 is energized. If a binary "zero" is applied to this terminal, the relay is de-energized if it was previously energized or remains unenergized if it was previously unenergized. The motor 314 moves the wiper arms so that successive pulses are applied to successive terminals. All of the wiper arms move together and consequently, each set of incoming data would normally set every relay group in matrix 101. However, a plurality of contacts B′–through y′–1 are included in the respective wiper arms. At any one time, only one pair of contacts is closed and consequently, only one group of relays is energized in accordance with the incoming set of data. The particular pair of contacts are closed prior to the operation of motor 314. Conductor 261 is pulsed and motor 314 begins to operate simultaneously with the appearance of the first data pulse at the output of delay 312.

The incoming data is applied to conductor 249 at the same time it is applied to conductor 209. The data is then applied to each of conductors 268 which in turn are connected to respective subprogram controls. The subprogram control 248–B thus is aware of the exact moment that the incoming data was received and applied to conductor 209. As the delay of delay 312 is fixed, the subprogram control 248–B knows when the first bit in set B is applied to terminal 313. At this time an output signal is applied to conductor 269 which is connected to one input of OR gate 259. An output pulse from OR gate 259 triggers the monostable pulser 260 which in turn applies a control signal to conductor 261. This signal governs the operation of the motor 314. All of the wiper arms 308 rotate in the counterclockwise direction, each one passing a respective group of terminals.

The incoming data pulses, however, are applied only to the terminals 307 in group B because when motor 314 first operates only contacts B'–1 are closed. The initial closing and subsequent locking of contacts 201–B–1 cause relay 303–B to energize. The closing of contacts 303–B–1 connects the coil of relay B' to the first stage of ring counter 304. Initially ring counter 304 is unenergized, that is, no stage is activated. The initial data on conductor 301 is applied via conductor 315 to the reset terminal of shift register 304. The first pulse of either polarity resets the shift register. In a similar manner, shift register 122 is reset by the first data pulse on conductor 131. In the remote unit shift registers 604 and 520 are reset by the first pulse on conductor 512. Were the central office to have originated the call, the first pulse on conductor 126 would have reset the two shift registers 122 and 304 and the first pulse on conductor 601 would have reset shift registers 604 and 520.

After the energization of subprogram control 248–B, a single pulse is applied to conductor 270. This pulse passes through OR gate 253 and operates monostable pulser 254. A pulse is thus applied to conductor 255 which energizes the first stage of ring counter 304. Current flows from the output of the first stage of the ring counter through contacts 303–B–1 and the coil of relay B' to ground. Relay B' energizes and thus when the control pulse is applied to conductor 261 to initiate the operation of motor 314 it is seen that contacts B'–1 are closed. The first set of data causes only the relays in set B in matrix 101 to be energized accordingly.

After the energization of these relays the subprogram control 248–B applies a signal to conductor 271. This signal passes through OR gate 256 and operates monostable pulser 257. A pulse is applied to conductor 258 which causes motor 314 to return all of the wiper arms 308 to their initial positions as shown.

Figure 8:
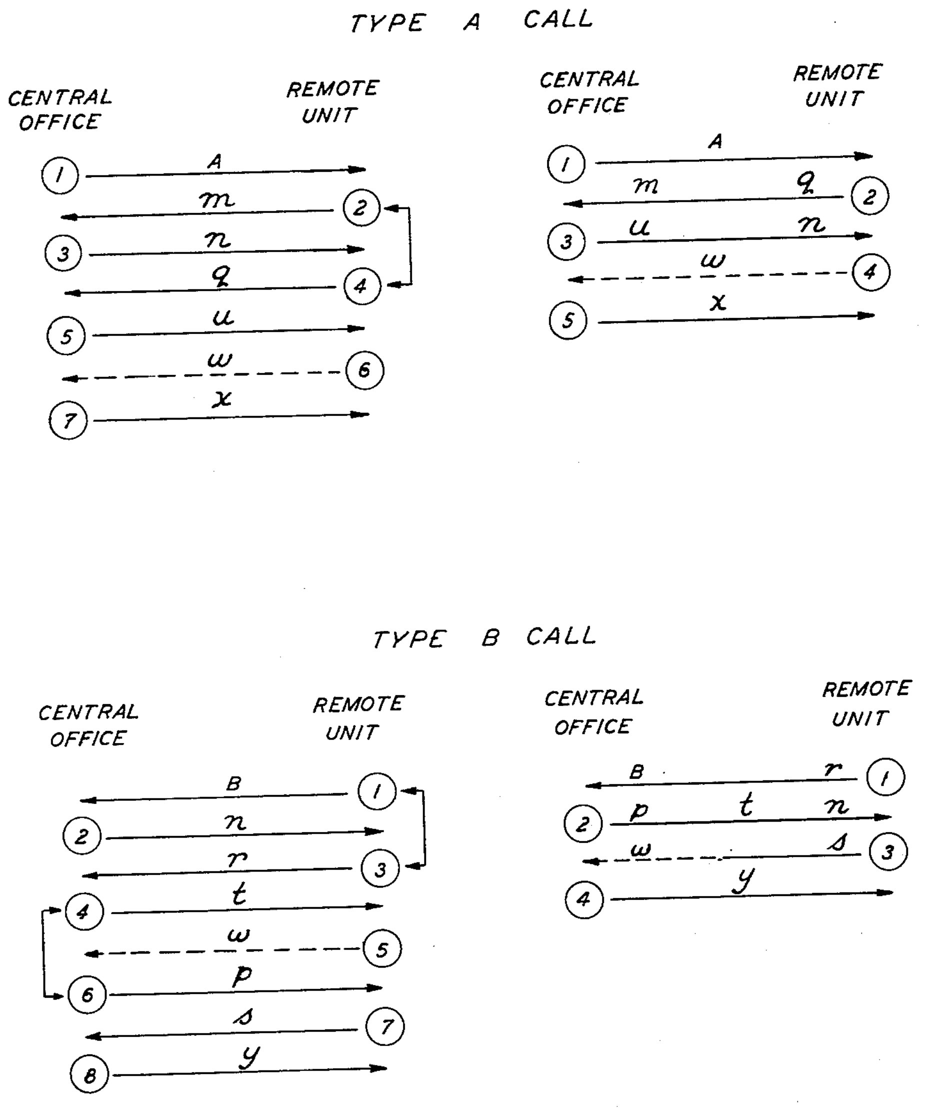

In conventional systems of the kind disclosed, the central office unit, for a type B call, would then set relay group *n* in matrix 101. A scanner at the central office unit would scan this set in due course and send the information to the remote unit. The remote unit would then respond with set *r*. However, as seen in FIG. 8, set *r* is independent of set *n* and consequently is available at the remote unit simultaneously with set B. The remote unit causes set *r* to be transmitted immediately after set B rather than wait for set *n* to be received back.

In the remote unit immediately after subprogram control 412–B applies the correct number of pulses on conductor 418 to effect the transmission of data set B it pulses conductor 422. The pulse is transmitted through OR gate 423 and triggers monostable pulser 424. A pulse is thus applied to conductor 408. This pulse in turn energizes the first stage of ring counter 520.

The initial energization of relay 514–B causes contacts 514–B–1 to close. When the first stage of ring counter 520 is energized, it is seen that relay *r* operates. Contacts *r*–1, contained in one of the wiper arms 521 within scanner 502, close. A short time after the closing of contacts *r*–1, this time being determined by delay 522, the original pulse on conductor 408 is applied to conductor 523. This pulse causes motor 524 to rotate the wiper arms 521 in the counterclockwise direction. As a result, each of the wiper arms passes a respective plurality of terminals 525 in succession. All of the wiper arms are connected in common to terminal 526. However, as only contacts *r*–1 are closed, a conducting path is provided only between the terminals in group *r* and the common terminal 526. As a result, the successive voltages at the common terminal 526 are dependent only upon the voltages of those terminals in scan point matrix 527 that are associated with the relays in group *r* in matrix 500. The voltage pulses are transmitted along conductor 516, through contacts 413–1, and along conductors 518 to the data input of transmitted 416.

Subprogram control 412–B knows the number of terminals in group *r* and consequently is aware of how long a time is required to scan those terminals 525 associated with the relays in group *r*. When set *r* is completely stored in transmitter 416, the subprogram control 412–B again applies the correct number of shift pulses to conductor 418. As with set B, the data bits are shifted out of the transmitter and into modulator 407. At the same time that subprogram control 412–B pulses conductor 418, a single pulse is applied to conductor 450. This pulse after passing through OR gate 441 operates monostable pulser 442 which pulses conductor 431, connected to the second of the two inputs of motor 524. This pulse causes the motor to return all of the wiper arms 521 to their initial positions as shown.

Subprogram control 248–B is aware that data set *r* immediately follows data set B. Data set *r* is applied to conductor 249 and to conductor 209 as was data set B. Again, when subprogram control 248–B has determined that the first bit has reached terminal 313, conductor 261 is pulsed and motor 314 operates. However, it is now necessary that contacts *r*'–1 be closed and contacts B'–1 be opened in order that relay group *r* in matrix 101 be set rather than relay group B. As the pulses in group *r* are passing through delay 312, subprogram control 248–B pulses conductor 270 once again. Another pulse is applied to conductor 255 and consequently the energized stage of ring counter 304 becomes stage 2, stage 1 de-energizing. At this time relay B' de-energizes as it is now connected to the unenergized stage 1. However, relay *r*', connected through contacts 303–B–2 to stage 2 of ring counter 304 is operated. Consequently, contacts *r*'–1 close, and when the control pulse is applied to conductor 261 to operate motor 314, the pulses representing the energization states of the relays in group 5 at the remote unit are applied in succession to the terminals 307 in group *r* of the relay setting circuit 305. These pulses cause the relays in group *r* in matrix 101 to be energized accordingly.

A checking circuit is provided to determine whether or not an error has occurred in the transmission process. The information transmitted along conductor 267 is returned along conductor 206 to demodulator 425. The demodulated pulses are stored in the top register of comparator 426. The original data pulses transmitted are stored in the lower register of this comparator, this data being stored in the lower register simultaneously with the placing of the original data in transmitter 416. When all of the data is received back, the comparator compares the two binary sequences. If they check a first signal is applied to conductor 427, connected to one input of each of the subprogram controls. This input affects only the subprogram control 412–B which is the only one energized at this time. If this first signal is applied the subprogram control B takes no steps out of the ordinary as the proper data sequence has been most probably transmitted.

If, on the other hand, an error has occurred in the transmission along conductor 267 (or along conductor 206) a second signal is applied to conductor 427. This signal notifies the subprogram control 412–B that an error has occurred in the transmission and that the same set of data must be transmitted once again. The original data is restored in transmitter 416 via conductor 444 as it is shifted out. Consequently, it is still available in the transmitter and the subprogram control 412–B merely applies the same number of shift pulses to conductor 418, and the same data set is transmitted once again to the other unit. It should be noted that this set of data follows the previous same set of data after a time equal to twice the time required for transmitting between the two units. This results from the fact that the original set of data must travel along conductor 267 to the central office unit and then back again along conductor 206 before subprogram control 412–B causes its transmission once again. All of the subprogram controls in the invention are controlled to delay the transmission of any set of data after a previous set by a time interval at least slightly greater than this time required for two transmissions. This is easily accomplished by a timing circuit as the time of transmission is controlled by the time of the application of the shift pulses to conductor 418 or an equivalent conductor connected to the subprogram controls other than 412–B. Only if an error has occurred and the data must be transmitted once again do two sets of data follow each other by less than this minimum time interval. In the event that two sets of data follow each other, such as sets B and *r*, the second set is not stored in the transmitter until the first set has not only been transmitted but until it is determined that it has been transmitted correctly as well. This is accomplished by enabling the subprogram controls to operate monostable pulser 424, which controls the scanning of the second set, only after it has been determined that the first set has been transmitted correctly.

At the central office unit, incoming data applied to conductor 249 is also applied to conductor 250. Timing circuit 251 is of the type which begins a time-out period at the termination of every set of data applied to input conductor 250. This time-out interval is greater than the time between two successive transmissions of two different sets of data, this time being greater, as stated above, than twice the transmission time between the two units. The time-out period is less, however, than the time between the transmission of two successive identical data groups. Consequently, a signal is applied to conductor 252 indicating the completion of the time-out interval only if a set of data is not followed by a retransmission of the same set. Conductor 252 is connected to an input of each of the subprogram controls 248–A through 248–N. In the event the data set was transmitted correctly, the time-out of the timing circuit 251 is completed, a signal is applied to conductor 252 and the energized subprogram control is notified that a correct transmission has occurred. It is only at this time that the subprogram control causes the ring counter 304 to advance and the motor 314 to operate. The delay time of delay 312 is naturally greater than the time-out period to control the application of the data pulses to terminal 313 only after it is determined that they contain no errors.

In the event that the time-out signal is not applied to conductor 252 after the reception of the first set of data, this being due to the fact that the same set is being retransmitted and the time-out interval was not completed before a new time-out interval was initiated, the stored program control is made aware that the same set of data is being retransmitted. Consequently, ring counter 304 is not advanced and motor 314 is not operated. Only after a time-out pulse on conductor 252 is received and it is determined that no error has occurred in the transmission is ring counter 304 advanced and motor 314 operated. By the use of the timing circuit 251, it is apparent that the stored program control 240 is notified that no error has occurred in the transmission without requiring a separate signal or communication path between the two end units. In a similar manner timing circuit 428 enables each subprogram control 412– in stored program control 400 at the remote unit to determine that no error has occurred in the transmission of a data set from the central office unit to the remote unit without requiring a special signal or separate communication channels.

In the illustrative example, a type B call, the remote unit transmits and the central office unit stores sets B and *r* in succession. After the second operation of motor 314 and the setting of relay group *r* in matrix 101, conductor 253 is pulsed, and the wiper arms 308 revert to their normal positions as shown. At this time relay group *n* is scanned and the information transmitted to the remote unit.

The subprogram control 248–B pulses conductor 272. A pulse is transmitted through OR gate 247 and triggers monostable pulser 246. The resulting pulse on conductor 114 is applied to both delay 118 and conductor 123. The pulse on the latter conductor, connected to the input of ring counter 122, causes stage 1 of this counter to become energized.

Relay 128–B is the only one of relays 128– that is operated, a result of contacts 201–B–1 being the only ones of contacts 201– –1 that are operated. Thus, the only contacts that are operated within scanner control 120 are contacts 128–B–1 through 128–B–4. When the first stage of ring counter 122 is energized, it is seen that current flows from the first stage through contacts 128–B–1 and the coil of relay *n* to ground. As a result relay *n* operates.

Contacts *n*–1 in scanner 108 close, and thus only wiper arm 111 associated with the terminals 110 in group *n* is made conducting. After contacts *n*–1 close, the original pulse on conductor 114 appears at the output of delay 118 and is applied to conductor 132. This pulse causes motor 109 to operate and all of the wiper arms move in a counterclockwise direction and scan their respective terminals. Only the voltage conditions on terminals 110 in group *n*, however, are transmitted along the respective wiper arm to common terminal 133. The data pulses are transmitted along conductor 112 to coder 115. These pulses also appear on conductor 125. However, contacts 264–1 and 264–3 are open, and the pulses on conductor 125 have no effect.

The pulses on conductor 112 pass through contacts 218–1 and the top conductor in coder 115 to conductor 117 which is connected to the data input of transmitter 221. The subprogram control 248–B allows a sufficient time after the original pulse is applied to conductor 272, which initiates the scanning of group *n*, for the data to be stored in the transmitter. After this time, conductor 234 is pulsed a number of times dependent upon the number of bits stored in the transmitter. The data bits shifted out modulate a carrier waveform in modulator 225 and are sent along transmission line 226 to the remote unit. As with other sets of data the bits are returned to the central office unit and are compared in comparator 227 with the original data transmitted. If the two registers in comparator 227 do not have the same data stored therein, the pulse on conductor 231 notifies the subprogram control 248–B that an error has occurred in the transmission and that set *n* must be retransmitted. Conductor 234 is pulsed the appropriate number of times immediately upon the receipt of the signal on conductor 231 and set *n* is retransmitted once again. The first set *n* transmitted to the remote unit is not stored in relay group *n* in matrix 500 as timing circuit 428 does not time out after the reception of the first set. Thus, although the pulses in set *n* originally transmitted appear at the output of delay 621, conductor 429 is not pulsed and motor 605 does not operate. This motor operates only after timing circuit 428 has timed out, indicating that the data set received contains no errors.

In conventional systems the central office must wait for set *n* to be received by the remote unit and for set *r* to be sent back before the central office scans and transmits set *t*. However, set *r* is already available in the central office as it was transmitted with set B by the remote unit. Consequently, set *t* is immediately available in the central office matrix 101 after the transmisison of set *n*. The central office unit, therefore, immediately scans set *t*. After the subprogram control 248–B determines that set *n* has been transmitted with no errors to the remote unit, conductor 214 is pulsed to restore motor 109 and conductor 272 is pulsed a second time. Stage 1 of ring counter 122 de-energizes and stage 2 energizes. Relay *n* releases. Current now flows from the output of stage 2 through contacts 128–B–2 and the coil of relay *t* to ground. By the time contacts *t*–1 in scanner 108 close, conductor 132 is pulsed. Motor 109 operates and data set *t* is stored in transmitter 221. Conductor 234 is then pulsed the correct number of times and set *t* is transmitted to the remote unit where it is stored. The subprogram control 248–B controls the transmission of set *t* at a time after the transmission of set *n*, that is sufficient to allow timing circuit 428 in the remote unit to time-out.

As seen in FIG. 8 set *p* is not dependent upon set *w* normally sent from the remote unit to the central office in response to the reception by the latter of set *t*. As set *p* is available in the central office with set *t*, set *p* is transmitted immediately following set *t*. After the signal on conductor 231 indicates that set *t* has been transmitted with no errors conductor 272 is pulsed a third time and stage 3 of ring counter 122 is energized. Relay *p* operates and terminals 101 in group *p* are scanned. Data set *p* is then transmitted by the central office unit and causes the relays in group *p* contained in matrix 500 to be set accordingly.

The remote unit normally responds with set *r* after it receives set *n*. However, set *r* has already been transmitted with set B. Thus, the next set of data to be transmitted by the remote unit is set *w*, after set *t* is received by the remote unit, even while set *p* is being transmitted in the opposite direction. The remote unit causes the relays in set *w* to be set in accordance with the particular call that is being placed after set *t* is received and acted upon and set *w* is then transmitted.

Subprogram control 412–B pulses conductor 422 which causes relay group *w* to be scanned in the ordinary manner. The pulses representing the states of the relays in group *w* appear in succession on conductor 516. However, the subprogram control 412–B is aware of the fact that in group *w* only one relay is energized at any one time. Rather than transmitting a number of bits equal to the number of relays in group *w*, a coded binary number is transmitted, this number indicating which particular relay in group *w* is energized. Fewer bits thus need be transmitted.

With the pulsing of conductor 422 subprogram control 412–B also energizes conductor 430. The energization of conductor 430 causes relay 413 to operate and contacts 413–1 to open and 413–2 to close. The dotted arrow 443 shows symbolically the control of coder 503 by stored program control 400. As the data pulses on conductor 516 enter coder 503, it is apparent that they now pass through contacts 413–2 rather than contacts 413–1. Translator 533 is any of well-known devices which translate a first series of pulses into a second series of pulses. The pulses on conductor 518 are different from those originally on conductor 516, the latter pulses, fewer in number, representing in coded binary form the particular relay in group *w* which is operated. The data bits are stored in transmitter 416 in the ordinary manner. The subprogram control 412–B pulses conductor 418 a number of times dependent upon the reduced number of bits in coded set *w*. The shift pulses are applied by subprogram control 412–B at a time after the original energization of conductor 422 that is sufficient to allow for the translation process. Coded set *w* is then transmitted to the central office unit.

The timing circuit 251 operates on coded set *w* in a manner identical to the operation of these units on an ordinary set of data. Motor 314 operates only after subprogram control 248–B determines that no error has occurred in the transmission.

The data transmitted must be decoded, however, before it is applied to terminal 313 in relay setting circuit 305. Subprogram control 248–B is aware that the set of data received is in coded rather than in ordinary form and causes conductor 273 to be energized. Relay 212 operates, contacts 212–1 open and contacts 212–2 close. The data bits on conductor 209 now pass through translator 311 before being applied to delay 312. The operation of translator 311 is the converse of the operation of translator 533. The coded data is decoded, and the series of pulses applied to the input of delay 312 is identical to the series of pulses originally determined by scanner 502 and appearing on conductor 516. Subprogram control 248–B, after allowing a sufficient time for the decoding process, pulses conductor 269 and motor 314 causes the relays in group *w* in matrix 101 to be set in a manner identical to the energization states of the respective relays in group *w* in matrix 500.

After a correct transmission of coded set *w*, subprogram control 412–B de-energizes conductor 430. Relay 413 releases and further sets of data are not coded in coder 503. In a similar manner, when subprogram control 248–B causes conductor 258 to be pulsed and motor 314 to restore, conductor 273 is de-energized and relay 212 thus releases. This relay controls decoder 310, the control being shown symbolically by arrow 211, to allow further data pulses to pass through contacts 212–1 directly to delay 312 rather than first being translated by translator 311.

After set *w* is transmitted, the central office conventionally replies with set *p*. However, set *p* has already been transmitted following set *t*. Set *p* is thus available at the remote unit and set *s* may be transmitted by the remote unit immediately following set *w*. Ring counter 520 is advanced once again and relay *s* operates. Set *s* is transmitted in the ordinary manner immediately following set *w*. The central office unit then scans set *y* and transmits it to the remote unit.

At this time, all of the necessary information for setting up a communication path for the call has been transmitted between the central office and remote subscriber units. The subprogram control 248–B, after an indication on conductor 231 that set *y* has been transmitted correctly, removes the ground applied to conductor 205. This conductor is initially grounded by the closing of contacts 201–B–1 in response to the brief operation of relay 201–B in sequence format detector 200. The initial grounding of conductor 205 energizes the subprogram control 248–B which in turn maintains a ground on conductor 205. It is the grounding of this conductor that causes relays 128–B, 303–B and 264 to operate. After the correct transmission of set *y*, subprogram control 248–B causes ground potential to be removed from conductor 205. This, in turn, de-energizes the subprogram control 248–B. All of relays 128–A through 128–N and 303–A through 303–N are now unoperated and the circuit is ready for either unit to seize it for processing a new call. When ground is removed from conductor 205, relay 264 releases and contacts 264–1 through 264–3 in the data link seizure circuit 127 close once again. At this time the central office end unit is in a position to be seized by the operation of either the central office or remote subscriber unit.

In a similar manner, after the operation of timing circuit 428, indicating that set *y* has been transmitted correctly, and the setting of the appropriate relays in matrix 500, conductor 432 is pulsed and motor 605 restored to normal. Subprogram control 412–B then removes the ground from conductor 411 and relays 514–B, 603–B and 404 release. The remote end unit, as well as the central office end unit, is now in a condition to be seized by either central office or remote subscriber units for the processing of a new call.

The scanners and relay setting circuits of the invention may advantageously be electronic counterparts of the electromechanical elements disclosed. Similar remarks apply to the scanner controls, relay setting circuit controls and other subcombinations of the invention.

It is to be understood that the embodiment shown and the methods disclosed are merely exemplary and that various modifications will be apparent to those skilled in the art without departing from the spirit and scope of the invention.

What is claimed is:

1. A two-way data transmission system connecting a telephone central office unit with a unit serving a plurality of subscribers comprising means for enabling either of said units to notify the other of the particular type of call to be processed, scanning means in each of said units for determining the data to be transmitted, means connected to each of said scanning means for controlling the scanning sequence of each of said scanning means in accordance with the particular type of call to be processed, means connected to each of said scanning means for controlling the time intervals between successive scans in accordance with the particular type of call to be processed, and means connected to said scanning means for coding predetermined bits of data in accordance with the particular type of call to be processed.

2. A data transmission system connecting a first unit with a second unit comprising means for enabling either of said units to notify the other of the particular type of data sequence to be transmitted, means in each of said units for determining the data to be transmitted in a predetermined order in accordance with the particular type of data sequence to be transmitted, means in each of said units for controlling the time intervals between successive data determinations in accordance with the particular type of data sequence to be transmitted, and means for coding predetermined bits of data in accordance with the particular type of data sequence to be transmitted.

3. A data transmission system comprising a transmitter station, a receiver station, a data link connecting said transmitter and receiver stations, means disposed at said transmitter station for notifying said receiver station of the particular type of data sequence to be transmitted from said transmitter station to said receiver station, a scan point matrix located at said transmitter station containing therein the data to be transmitted, means for scanning said scan point matrix in predetermined spatial and time sequences in accordance with the particular type of data sequence to be transmitted, said transmitter station including means for transmitting the scanned data to said receiver station, and means disposed at said receiver station for receiving and storing said data in predetermined spatial and time sequences in accordance with the particular type of data sequence transmitted.

4. A data transmission system in accordance with claim 3 further including means for coding and decoding predetermined data in said transmitter and receiver stations respectively.

5. A two-way data transmission system comprising first and second end units; each of said end units having a scan point matrix, scanning means, transmitting means and receiving means; each of said scanning means being operative to scan the associated scan point matrix; each of said transmitting means being operative to transmit the scanned information to the receiving means in the other end unit; means for enabling either end unit to notify the other of the particular type of data sequence to be transmitted back and forth between the two end units; means in each of said end units for controlling the associated scanning means to scan the associated scan point matrix in predetermined spatial and time sequence in accordance with said particular type of data sequence to be transmitted; and means disposed at each of said end units for coding and decoding predetermined data in accordance with said particular type of data sequence to be transmitted.

6. A two-way data transmission system in accordance with claim 5 further including means for enabling either of said end units to initiate a particular data sequence and means for preventing the initiation of another sequence until the completion of said particular sequence.

7. A two-way data transmission system in accordance with claim 6 further including means disposed at each of said end units for verifying the correct transmission of data and means for retransmitting any data which has been erroneously transmitted.

8. A low-speed data link comprising first and second memory groups, means for scanning said first memory group, means for transmitting the scanned information to said second memory group, means for setting said second memory group in accordance with the scanned information transmitted from said first memory group to said second memory group, and means for increasing the capacity of said data link, said capacity-increasing means including first and second synchronizing means disposed respectively at said first and second memory groups for respectively controlling the scanning and setting of said first and second memory groups in a particular one of a plurality of spatial and time sequences, and means for synchronously varying the spatial and time sequences controlled by said first and second synchronizing means.

9. A data transmission system connecting first and second registering means comprising means connected to each of said registering means for scanning said registering means, means connected to each of said scanning means for controlling the scanning of particular portions of said registering means in succession, means connected to each of said scanning means for controlling the scanning of said particular successive portions at predetermined time intervals, means connected to each of said scanning means for transmitting the scanned information to the other of said registering means, means connected to each of said registering means for receiving the transmitted information and for setting the associated registering means in accordance with the transmitted information, means connected to each of said setting means for controlling the setting in succession of particular portions of said registering means, means for controlling the setting of said successive particular portions at predetermined time intervals, and means for varying said particular successive portions and said predetermined time intervals of said scanning and setting means associated with both of said registering means.

10. A data transmission system in accordance with claim 9 further including means controlled by either of said registering means for operating said varying means.

11. A data link connecting first and second pluralities of registering means having scan point means individually connected to each of said pluralities of registering means for exhibiting the data contained in said respective pluralities of registering means, first means for setting said pluralities of registering means, said data link connecting said scan point means associated with each one of said pluralities of registering means with the first setting means associated with the other plurality of registering means for controlling the setting of said other plurality of registering means in accordance with the setting of said one plurality of registering means, second means connected individually to each of said pluralities of registering means for setting particular registering means in each of said pluralities responsive to the setting of other particular registering means in said same plurality by said first setting means characterized by means for controlling the transmission of data pertaining to said pluralities of registering means at predetermined time intervals, means for controlling the transmission of successive data pertaining to predetermined sequences of said registering means, and means controlled by either of said second setting means for determining said predetermined time intervals and said predetermined sequences.

12. A data link in accordance with claim 11 further including means for coding particular sequences of transmitted data and means controlled by said second setting means for determining said particular sequences of data.

13. A data transmission system connecting first and second pluralities of registering devices comprising means for scanning each of said pluralities of registering devices and for transmitting the scanned data to the other of said pluralities of registering devices, first means for setting said other plurality of registering devices in accordance with the data transmitted, second means connected to each of said pluralities of registering devices for controlling the setting of particular groups of registering devices in each of said pluralities responsive to the setting of other particular groups of registering devices in said same plurality by said first setting means, said transmitting means normally transmitting data back and forth between said first and second pluralities of registering devices in such a manner that data pertaining to one particular group of registering devices in either of said pluralities is followed by data pertaining to one particular group in the other of said pluralities with no information pertaining to a group of registering devices in one plurality immediately following information pertaining to another group of registering devices in the same plurality characterized by means for controlling said transmitting means to transmit data pertaining to groups of said registering devices in either of said pluralities immediately when said data becomes available without requiring the prior transmission of data pertaining to a group of registering devices in the other of said pluralities whereby data pertaining to a group of registering devices in either of said pluralities may be transmitted immediately after data pertaining to another group of registering devices in said same plurality, and means for controlling said first setting means to set said pluralities of registering devices in accordance with the transmitted data determined by said transmitting controlling means.

14. A method of transmitting information between first and second pluralities of registering devices wherein said registering devices in said first and second pluralities are to contain the same information and wherein the setting of any registering device in either of said pluralities in accordance with information transmitted controls the setting of others of said registering devices in the same plurality which information is then transmitted to the other of said pluralities, comprising the steps of:

(1) scanning and transmitting only information pertaining to groups of registering devices in each of said pluralities set in response to information transmitted immediately previously from the other of said pluralities, (2) scanning and transmitting in succession information pertaining to more than one group of registering devices in the same plurality if the setting of said registering devices depends only upon the information transmitted immediately previously from the other of said pluralities, (3) and coding information pertaining to particular groups of registering devices rather than transmitting said information in the same manner as all other information is transmitted when it is known from the previously transmitted information from the other plurality that said particular information should be in coded form.

15. A method of transmitting information between first and second pluralities of registering devices in accordance with claim 14 further including the step of:

(4) having either of said pluralities of registering devices notify the other of the particular sequence of information to be transmitted back and forth for determining the particular scanning, transmitting and coding sequences at each of said pluralities.

References Cited in the file of this patent

UNITED STATES PATENTS

| | | |
|---|---|---|
| 2,265,216 | Wolf | Dec. 9, 1941 |
| 2,275,224 | Henroteau | Mar. 3, 1942 |
| 2,957,949 | James et al. | Oct. 25, 1960 |
| 3,047,668 | Gotthardt et al. | July 31, 1962 |